(12) United States Patent
Ishii

(10) Patent No.: US 12,554,469 B2
(45) Date of Patent: Feb. 17, 2026

(54) PROGRAM CREATION DEVICE

(71) Applicant: FANUC CORPORATION, Yamanashi (JP)

(72) Inventor: Yuki Ishii, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 264 days.

(21) Appl. No.: 18/565,515

(22) PCT Filed: Jun. 25, 2021

(86) PCT No.: PCT/JP2021/024218
§ 371 (c)(1),
(2) Date: Nov. 30, 2023

(87) PCT Pub. No.: WO2022/269927
PCT Pub. Date: Dec. 29, 2022

(65) Prior Publication Data
US 2024/0256229 A1   Aug. 1, 2024

(51) Int. Cl.
*G06F 8/30* (2018.01)
*G06F 8/34* (2018.01)

(52) U.S. Cl.
CPC . *G06F 8/30* (2013.01); *G06F 8/34* (2013.01)

(58) Field of Classification Search
CPC ..................................... G06F 8/34; G06F 8/30
See application file for complete search history.

(56) References Cited

U.S. PATENT DOCUMENTS

| | | | | |
|---|---|---|---|---|
| 6,167,328 | A | 12/2000 | Takaoka et al. | |
| 10,152,034 | B2* | 12/2018 | Komatsu | G05B 19/406 |
| 2017/0308063 | A1* | 10/2017 | Kawai | G05B 19/406 |
| 2017/0371316 | A1* | 12/2017 | Kimura | G05B 19/4097 |
| 2021/0039256 | A1* | 2/2021 | Yamamoto | B25J 9/1638 |

FOREIGN PATENT DOCUMENTS

| | | | | |
|---|---|---|---|---|
| JP | 3462570 B2 * | 11/2003 | | |
| JP | 2005-108144 A | 4/2005 | | |
| JP | 2005196242 A | 7/2005 | | |
| JP | 2007054906 A * | 3/2007 | | |
| JP | 2019000938 A * | 1/2019 | | G05B 19/425 |
| JP | 6498366 B1 | 4/2019 | | |
| JP | 2021-091026 A | 6/2021 | | |
| WO | WO-9211590 A1 * | 7/1992 | | B25J 9/1658 |
| WO | 97/11416 A1 | 3/1997 | | |
| WO | WO-2020017092 A1 * | 1/2020 | | B25J 9/1653 |

* cited by examiner

*Primary Examiner* — Phillip H Nguyen
(74) *Attorney, Agent, or Firm* — HAUPTMAN HAM, LLP

(57) ABSTRACT

A program creation device provided with: a display unit for displaying a display screen that includes an operation trajectory of a machine, control commands for the machine, and parameter settings for the control commands; an input unit for inputting user operation information on the screen; and a program editing unit that, on the basis of the user operation information, links, on the same screen, an instruction regarding the operation trajectory and parameter settings for a corrected operation command based on sensor information, and edits an operation program for the machine.

9 Claims, 14 Drawing Sheets

PROGRAM CREATION DEVICE

RELATED APPLICATIONS

The present application is a National Phase of International Application No. PCT/JP2021/024218 filed Jun. 25, 2021.

TECHNICAL FIELD

The present invention relates to a program creation technique and particularly to a program creation device that enables intuitive program editing.

BACKGROUND ART

In order to intuitively create operation programs for machines including robots, machine tools, and the like, icon programming has been proposed in which icons representing control commands for the machines are arrayed so as to create operation programs. On the other hand, a technique of performing tracing control on machines based on sensor information acquired from sensors including a force sensor, a vision sensor, and the like is widely known in machining including cutting, grinding, polishing, welding, fitting, fastening, hemming, and the like.

When an operation program for performing a correction operation based on sensor information is created, teaching points constituting an operation trajectory of a machine are taught, and a correction section where the correction operation is performed in the operation trajectory is specified, while parameters for the correction operation are set. The parameters are often set separately from the operation program for repeated general use. Although it is necessary to create an operation program while uniquely linking an operation trajectory of a machine, a correction section where a correction operation is performed in the operation trajectory, and parameters for the correction operation, a display screen for the operation trajectory and a display screen for the parameters are often separately provided in a programming environment in the prior art, which makes intuitive programming difficult.

Patent Document 1 describes that functional icons are selected from a first region where functional icons constituting a control program of a robot are displayed, functional icons obtained by copying the functional icons are arranged in a second region, parameters of functions represented by the functional icons disposed in the second region are set, and the control program is created based on the functional icons and the setting.

CITATION LIST

Patent Literature

PTL 1: Japanese Patent No. 6498366B

SUMMARY OF INVENTION

Technical Problem

In view of problems in the prior art, an object of the present invention is to provide an intuitive programming editing technique.

Solution to Problem

According to an aspect of the present disclosure, there is provided a program creation device including: a display part configured to display a screen including an operation trajectory of a machine, a control command of the machine, and a parameter setting of the control command; an input part configured to input user operation information on the screen; and a program editing unit configured to edit an operation program of the machine by linking teaching of the operation trajectory and parameter setting of a correction operation command based on sensor information on the same screen, based on the user operation information.

Advantageous Effect of Invention

According to an aspect of the present disclosure, it is possible to edit teaching of an operation trajectory before correction and setting of a correction operation based on sensor information on the same screen, thereby enabling intuitive program editing.

DESCRIPTION OF EMBODIMENTS

Figure 1:
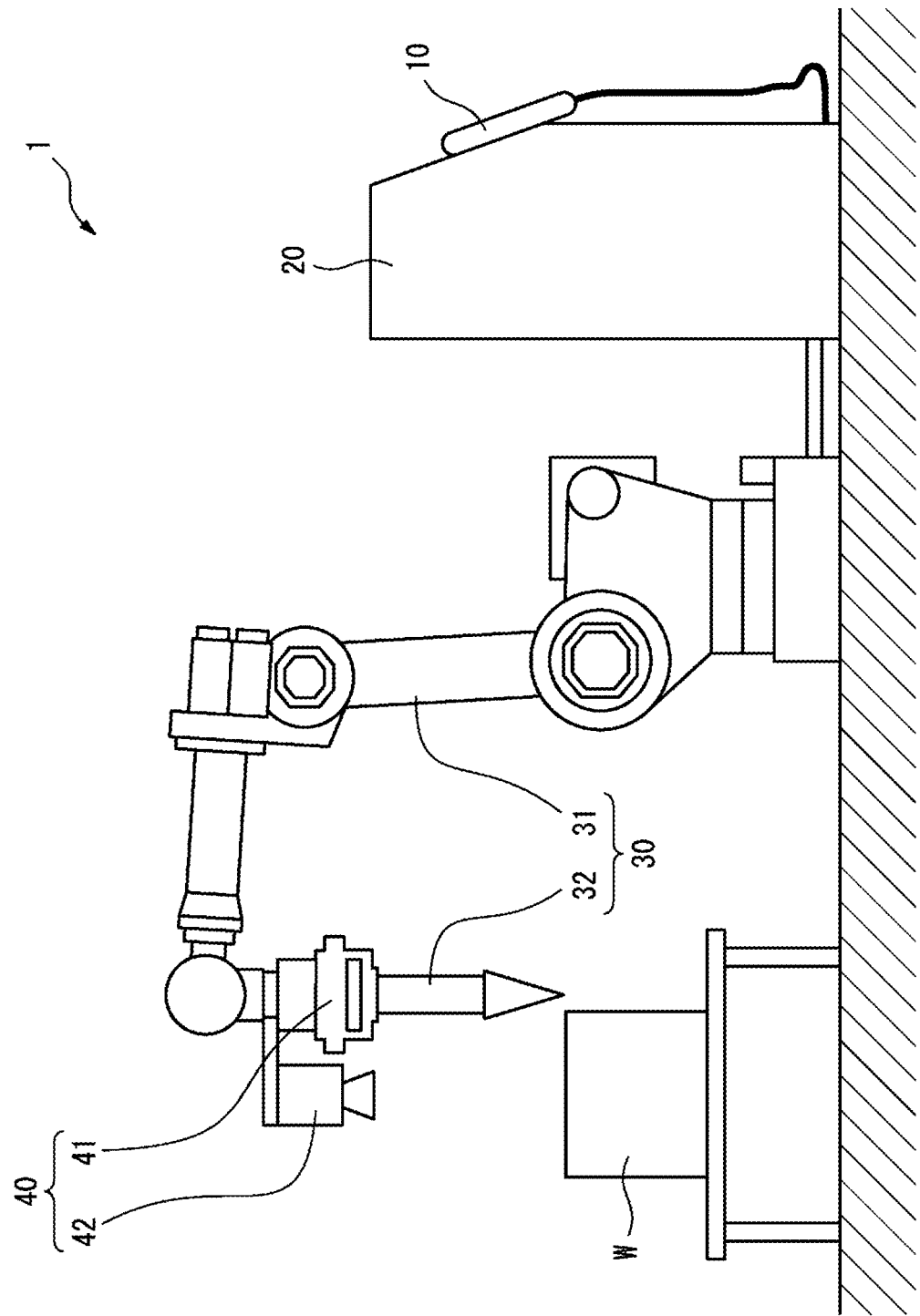
FIG. 1 is a configuration view of a machine system according to a first embodiment.

Embodiments of the present disclosure will be described in detail below with reference to the accompanying drawings. In the drawings, identical or similar constituent elements are given identical or similar reference signs. In addition, the embodiments to be described below are not intended to limit the technical scope of the invention or the meaning of terms set forth in the claims. In the specification, the term "screen" means an entire or partial region of a display for displaying, the term "window" means a partial region of the screen, and the term "view" means an image or a drawing depicted in the window.

FIG. 1 is a configuration diagram of a machine system 1 according to a first embodiment. The machine system 1 performs various kinds of operation on a workpieces W. Contents of the operation include cutting, grinding, polishing, welding, fitting, fastening, hemming, sealing, and the like. The machine system 1 includes a program creation device 10, a controller 20, a machine 30, and a sensor 40. In the first embodiment, description will be given on the assumption of the machine system 1 that deburrs the workpiece W.

Figure 2:
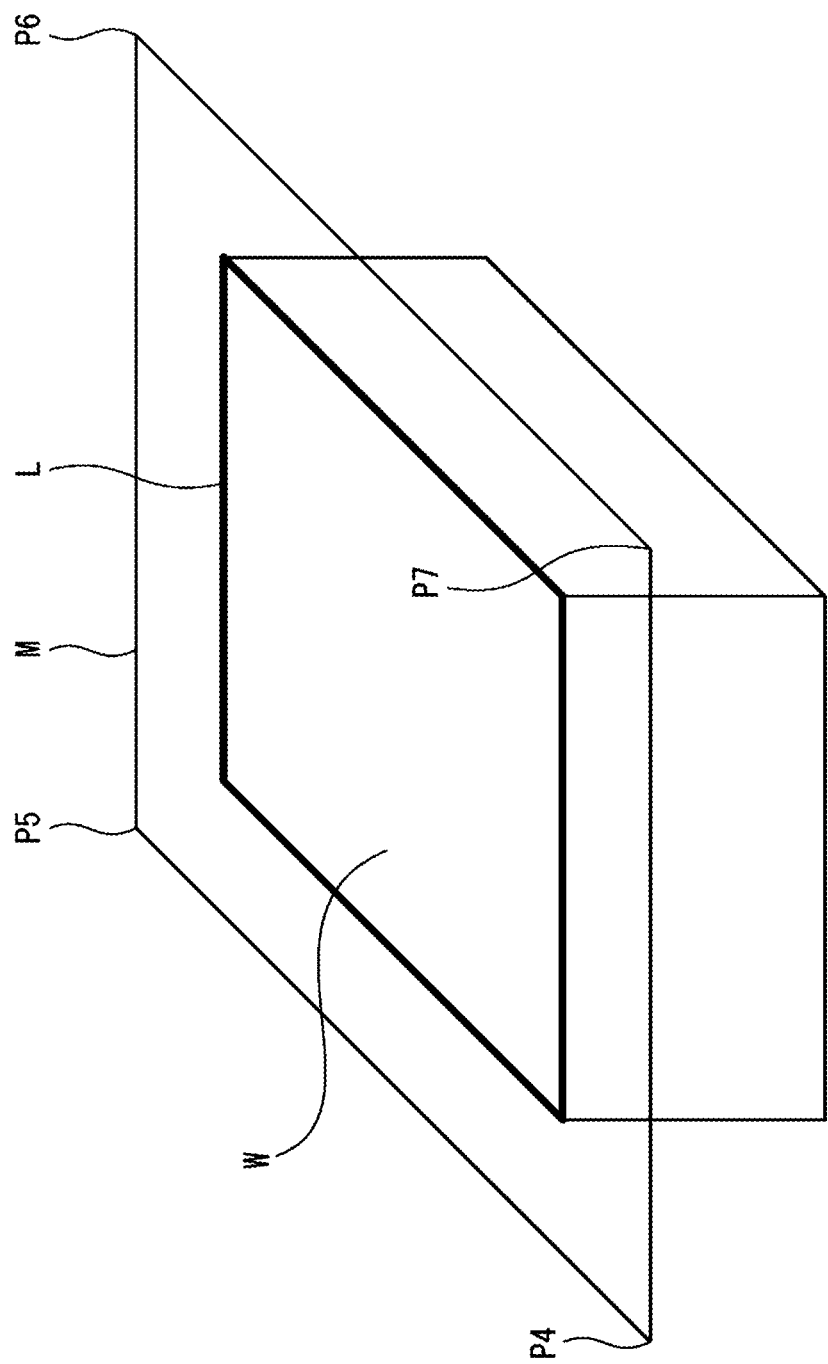
FIG. 2 is a perspective view of a workpiece.

FIG. 2 is a perspective view of the workpiece W. When an operation program for the machine 30 that performs deburring a thick line part of the workpiece W having a rectangular parallelepiped shape is created, it is necessary to teach teaching points P4 to P7 constituting an operation trajectory M of the machine 30 so that the machine 30 passes through a position that is slightly separated from a machining line L, to teach a start position (teaching point P4) and an end position (teaching point P7) of a correction operation based on sensor information, and to teach so that a control command group in a correction section to which the correction operation is applied in the operation trajectory M is sandwiched between the start position and the end position of the correction operation, while setting a target force, a pushing direction (in this example, a downward direction on the paper where the workpiece W is located), and the like as parameters for the correction operation based on the sensor information. While the machine 30 moves from the teaching point P4 to the teaching point P7, the controller 20 acquires sensor information from the sensor 40 in accordance with the operation program and corrects operations of the machine 30, based on the acquired sensor information.

Referring to FIG. 1 again, the program creation device 10 creates the operation program for the machine 30 for performing the correction operation based on the sensor information. The program creation device 10 is communicably connected to the controller 20 via wired or wireless connection. The program creation device 10 is a robot teaching device, for example, but the program creation device 10 may be an external computer device that is communicably connected to the controller 20 rather than a robot teaching device in other embodiments. The program creation device 10 transmits the created operation program to the controller 20.

The controller 20 is communicably connected to the program creation device 10, the machine 30, and the sensor 40 via wired or wireless connection. The controller 20 controls the machine 30 in accordance with the operation program received from the program creation device 10. The controller 20 acquires sensor information directly from the sensor 40, but in other embodiments, the program creation device 10 or an external computer device may acquire the sensor information from the sensor 40, and the controller 20 may acquire the sensor information indirectly from the program creation device 10 or the external computer device. The controller 20 corrects operations of the machine 30 based on the acquired sensor information.

The program creation device 10 and the controller 20 include a computer device including a processor, a memory, an input/output part, and the like. The processor includes a semiconductor integrated circuit that executes a computer program, for example, a central processing unit (CPU), a micro processing unit (MPU), or the like, but in other embodiments, the processor may include another semiconductor integrated circuit that rewrites and executes the computer program, for example, a programmable logic device (PLD), a field programmable gate array (FPGA), or the like. The memory includes a semiconductor storage device that stores various kinds of data, for example, a random access memory (RAM), a read only memory (ROM), or the like, but in other embodiments, the memory may include another storage device such as a magnetic storage device or the like.

The machine 30 is connected to the controller 20 via wired or wireless connection. The machine 30 is controlled by the controller 20 in accordance with the operation program and performs the operation on the workpiece W while executing the correction operation based on the sensor information. The machine 30 includes a robot 31 and a tool 32, but in other embodiments, the machine 30 may include a machine tool and a tool. Although not illustrated in the drawing, the robot 31 includes a plurality of links that can perform relative motion, a motor that drives the links, and a motor drive device that drives the motor. Similarly, although not illustrated in the drawings, the tool 32 includes a movable part, a motor that drives the movable part, and a motor drive device that drives the motor. The motor drive devices of the robot 31 and the tool 32 are communicably connected to the controller 20 and are controlled by the controller 20, but in other embodiments, the motor drive device of the robot 31 and the tool 32 may be disposed inside the controller 20. Further, in other embodiments, the robot 31 and the tool 32 may be controlled by independent separate controllers.

The robot 31 includes the tool 32 attached to a robot distal end and transports the tool 32 toward the workpiece W, but in other embodiments, the robot 31 may take out the workpiece W and transport the workpiece W toward the tool 32, or the robot 31 may transport the workpiece W to another workpiece as will be explained in an embodiment described later. The robot 31 is an industrial robot such as a vertical articulated robot, a horizontal articulated robot, an orthogonal robot, a parallel link-type robot, a cooperative robot, and the like, but in other embodiments, the robot 31 may be a robot in another form such as a humanoid.

The tool 32 is attached to the robot distal end, is transported toward the workpiece W by the robot 31, and performs the operation on the workpiece W, but in other embodiments, the tool 32 may be fixed at a different location than the robot 31 and perform the operation on the workpiece W transported by the robot 31, or the tool 32 may be a hand that takes out the workpiece W, as will be described later. The tool 32 is a grinding tool for deburring, but in other embodiments, the tool 32 may be another operation tool such as a cutting tool, a polishing tool, a welding tool, a fitting tool, a fastening tool, a hemming tool, a sealing tool, and the like or may be a hand tool of a multiple-finger gripping type, a magnetic adsorption type, a vacuum adsorption type, a Bernoulli type, or the like.

The sensor 40 includes a force sensor 41, or a vision sensor 42, or a distance sensor, or the like. Although the sensor 40 is attached to the machine 30, the sensor 40 may be fixed at a different location than the machine 30 in other embodiments in which the sensor 40 includes a sensor other than the force sensor 41. The sensor 40 is communicably connected to the controller 20 via wired or wireless connection, but in other embodiments, the sensor 40 may be communicably connected to the program creation device 10 or an external computer device.

Although the force sensor 41 is attached to the tool 32 and detects a reactive force from the workpiece W as sensor information, the force sensor 41 may detect a reactive force from the tool 32 as sensor information in other embodiments in which the robot 31 transports the workpiece W. The force sensor 41 is a six-axis force sensor and detects a force in three axis directions and moments around three axes, but in other embodiments, the force sensor 41 may be a three-axis force sensor, and in this case, the force sensor 41 detects only forces in the three axis directions. The force sensor 41 includes various force sensors of a strain gauge type, a piezoelectric type, an optical type, an electrostatic capacity type, and the like.

The vision sensor 42 is attached to the machine 30, but in other embodiments, the vision sensor 42 may be fixed at a different location than the machine 30. The vision sensor 42 detects the position (and orientation) of the workpiece W as sensor information. The vision sensor 42 includes various types of three-dimensional sensors of a time-of-flight type (TOF type), a triangulation type, a focused type, and the like.

Figure 3:
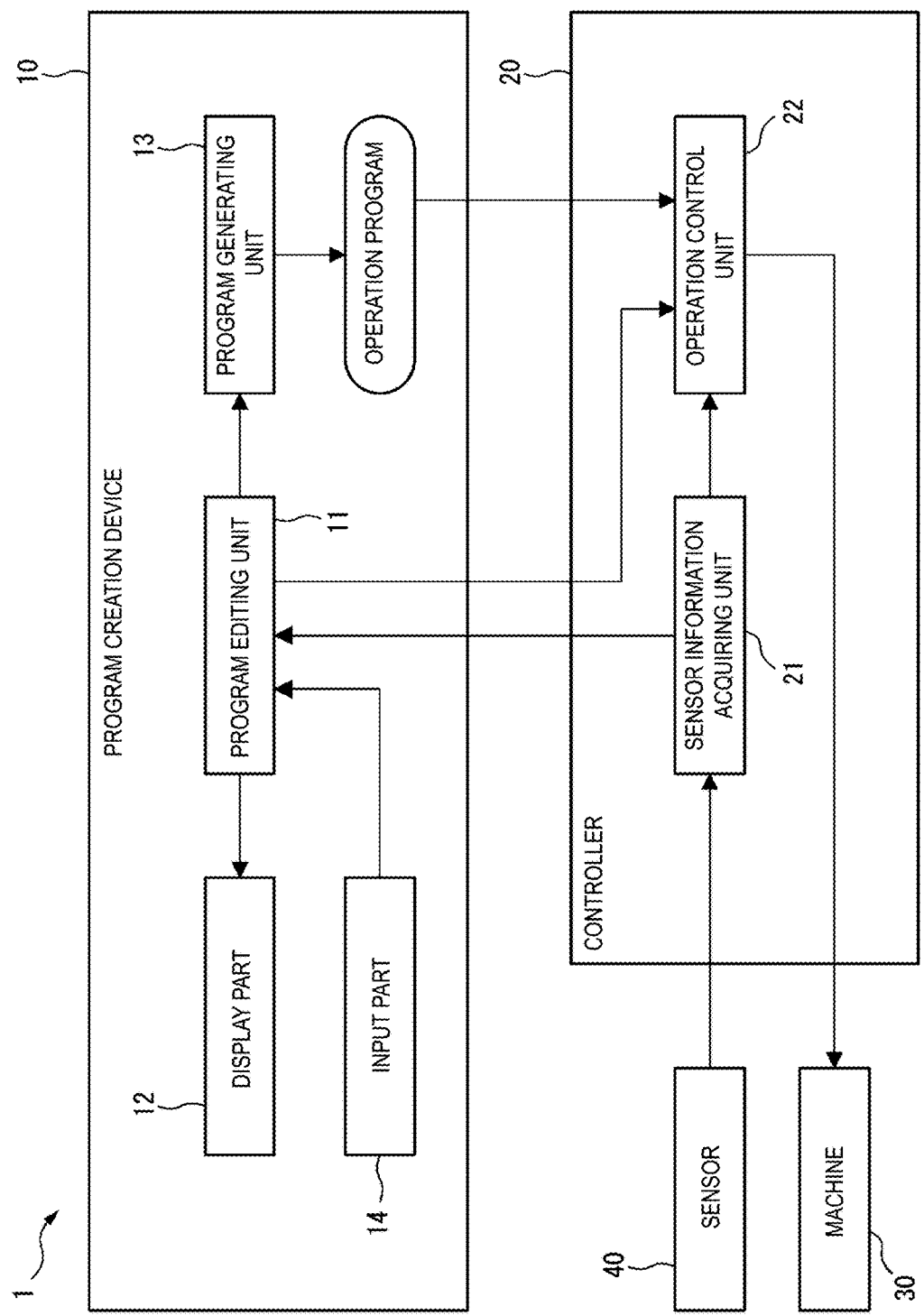
FIG. 3 is a functional block diagram illustrating a machine system according to the first embodiment.

FIG. 3 is a functional block diagram of the machine system 1 according to the first embodiment. The program creation device 10 provides a visual-based programming environment (an icon-based programming environment in the present embodiment), but in other embodiments, the program creation device 10 may provide a programming environment in the prior art (e.g., a text-based programming environment). The program creation device 10 includes a program editing unit 11, a display part 12, and an input part 14. The program creation device 10 may further include a program generating unit 13. The controller 20 includes sensor information acquiring unit 21 and an operation control unit 22.

The program editing unit 11 generates a view to be displayed on a programming screen and sends the generated view to the display part 12. Further, the program editing unit 11 receives user operation information on the programming screen from the input part 14, generates a view of an edited operation program for the machine 30 based on the user operation information, and sends the generated view to the display part 12 and the program generating unit 13. When the display part 12 and the input part 14 are a touch panel display, the user operation information includes a tapping position, a double-tapping position, a drag and drop position, a pinch-in position, a pinch-out position, and the like. The program editing unit 11 edits the operation program for the machine 30 by linking teaching of the operation trajectory M and parameter setting of a correction operation command based on the sensor information on the same programming screen, based on the user operation information. The program editing unit 11 is part or all of a processor including a CPU, an MPU, an FPGA, an ASIC, or the like, but in other embodiments, the program editing unit 11 may be part or all of a computer program.

The display part 12 displays the view generated by the program editing unit 11 on the programming screen. The display part 12 displays the programming screen including the operation trajectory M of the machine 30, the control command of the machine 30, and the parameter setting of the control command. The control command includes various commands such as an operation command for operating the machine 30, a correction operation command based on the sensor information, an application command for causing the machine 30 to perform a complicated operation, a condition branching command, a loop command, and the like. For example, the application command includes a palletizing command for loading the workpiece W on a pallet, a depalletizing command for taking out the workpiece W one by one from the pallet, and the like. For example, the parameters of the control command include a position (and orientation) of a teaching point, a motion speed, and the like in a case of an operation command, and includes a target force, a pushing direction (correction direction), a start point, an end point, and the like in a case of a correction operation command based on the sensor information.

The input part 14 inputs user operation information on the programming screen. The display part 12 and the input part 14 are composed of various touch panel displays including an ultrasonic surface acoustic wave type, a resistive film type, an infrared type, and the like, but in other embodiments, the display part 12 and the input part 14 may be composed of separated devices. For example, the display part 12 may be composed of a display for displaying such as a liquid crystal display, and the input part 14 may be composed of input devices such as a mouth, a keyboard, and the like.

The program generating unit 13 converts the operation program edited by the program editing unit 11 into an operation program including a source code, an object code (machine language), an intermediate code, a byte code, and the like. The program generating unit 13 transmits the generated operation program to the controller 20. The program generating unit 13 is part or all of a processor such as a CPU, an MPU, an FPGA, an ASIC, or the like, but in other embodiments, the program generating unit 13 may be part or all of a computer program.

The sensor information acquiring unit 21 acquires sensor information from the sensor 40. The sensor information acquiring unit 21 sends the acquired sensor information to the operation control unit 22. Although the sensor information acquiring unit 21 is part or all of a processor such as a CPU, an MPU, an FPGA, an ASIC, or the like, the sensor information acquiring unit 21 may be part or all of a computer program.

The operation control unit 22 acquires the operation program from the program creation device 10 and controls operations of the machine 30 in accordance with the operation program. Further, the operation control unit 22 receives the sensor information from the sensor information acquiring unit 21 in accordance with the operation program, generates an operation correction amount based on the received sensor information, generates a correction operation command based on the generated operation correction amount, and sends the generated correction operation command to the machine 30. The operation control unit 22 transmits the generated correction operation command to the motor drive device of the machine 30. Although the operation control unit 22 is part or all of a processor such as a CPU, an MPU, an FPGA, or the like, the operation control unit 22 may be part or all of a computer program in other embodiments.

Figure 4:
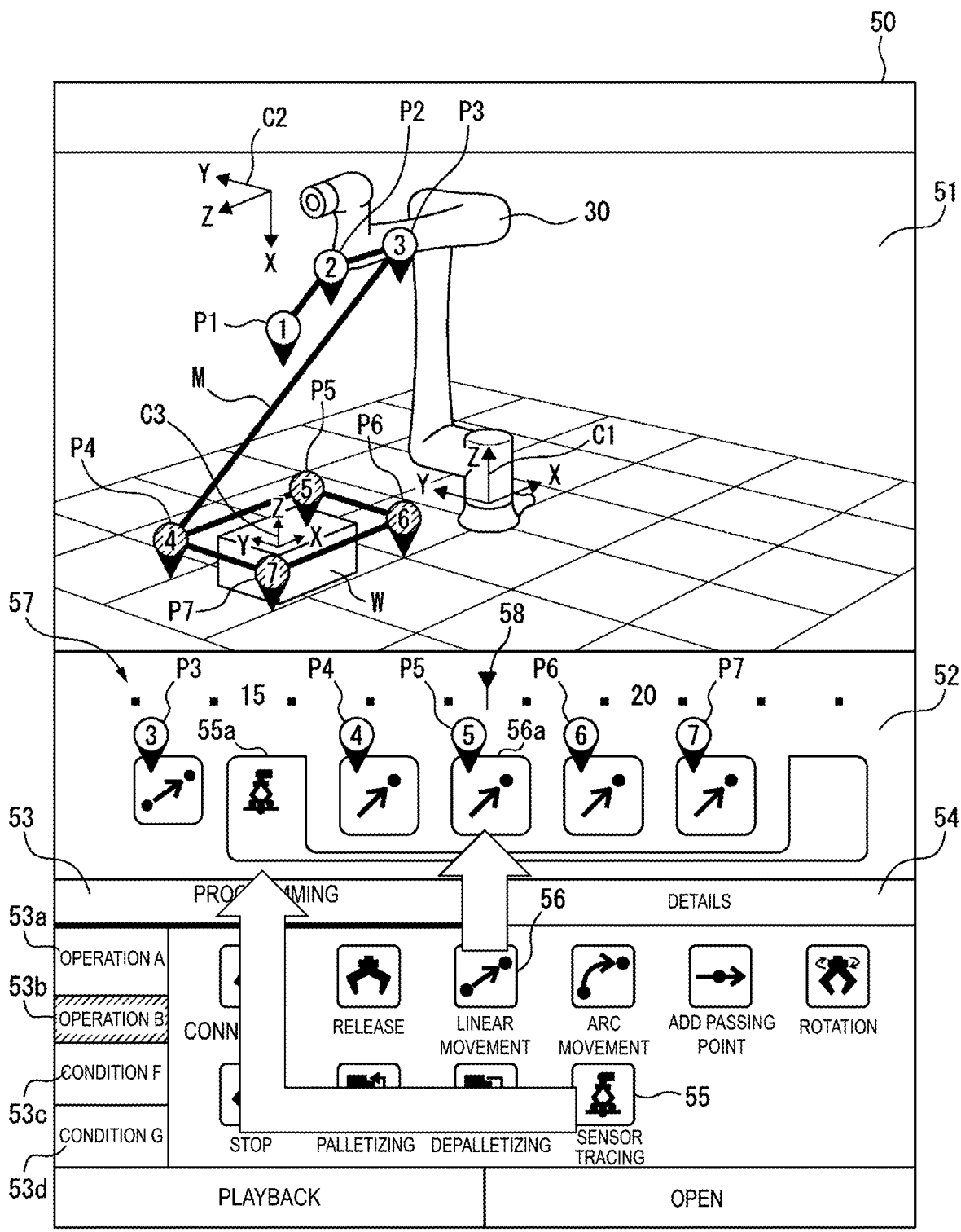
FIG. 4 is a diagram illustrating a programming screen according to the first embodiment.

FIG. 4 is a diagram illustrating the programming screen 50 according to the first embodiment. The program editing unit 11 generates the programming screen 50 including an operation trajectory window 51, a program editing window 52, a command selection window 53, a command setting window 54, and the like, and the display part 12 displays the generated programming screen 50 on the display for displaying. Either one of the command selection window 53 or the command setting window 54 is selected and displayed due to restriction of the screen size, but in other embodiments, those may be displayed at the same time.

Once the input part 14 inputs user operation information for adding the teaching points P1 to P7 constituting the operation trajectory M of the machine 30 to the operation trajectory window 51, the program editing unit 11 generates an operation trajectory view in which the operation trajectory M of the machine 30 and the teaching points P1 to P7 constituting the operation trajectory M are depicted in a virtual space where the shape model of the machine 30 is arranged, and the display part 12 displays the generated operation trajectory view in the operation trajectory window 51.

The operation trajectory view may be an image or a drawing in which a shape model of the workpiece W is further arranged in the virtual space. The teaching points P1 to P7 are depicted by marks for identifying the teaching points. The marks for identifying the teaching points P1 to P7 are pin marks including identification symbols (numbers 1 to 7 in this example), but in other embodiments, the marks may be marks in other forms such as diamond-shaped marks, triangular marks, circular marks, or the like. Furthermore, the operation trajectory view is preferably an image or a drawing including various coordinate systems, such as a machine coordinate system C1, a tool coordinate system C2, a workpiece coordinate system C3, a user coordinate system (not illustrated), and the like, depicted in the virtual space. The machine coordinate system C1 is fixed at a reference position of the machine 30, the tool coordinate system C2 is fixed at a reference position of the tool 32, the workpiece coordinate system C3 is fixed at a reference position of the workpiece W, and the user coordinate system is fixed at a user's specified position.

The program editing unit 11 generates a program view in which a time axis 57 of the operation program and an execution start line 58 of the operation program are depicted in the program editing window 52, and the display part 12 displays the generated program view in the program editing window 52.

Further, once the input part 14 inputs user operation information of selecting icons 55 to 56 representing the control command of the machine 30 and moving them from the command selection window 53 to the program editing window 52, the program editing unit 11 copies the icons 55 to 56 representing the control command and generates a program view in which the copied icons 55a to 56a representing the control command are arrayed, and the display part 12 displays the generated program view in the program editing window 52. Further, the program generating unit 13 generates the operation program in accordance with the array of the icons 55a to 56a representing the control command, parameter setting of the control command, and the like. The user operation of selecting the icons 55 to 56 representing the control command and moving them from the command selection window 53 to the program editing window 52 may be an operation of moving the icons 55 to 56 representing the control command while touching them with one finger and releasing the finger (so-called drag and drop) or the like.

Once the input part 14 inputs user operation information of selecting the icon 56 representing the operation command and moving it from the command selection window 53 to the program editing window 52, the program editing unit 11 copies the icon 56 representing the operation command and generates a program view in which the copied icon 56a representing the operation command is arranged, and the display part 12 displays the generated program view in the program editing window 52. Also, the program generating unit 13 creates the operation program in accordance with the array of the icon 56a representing the operation command, the parameter setting of the operation command, and the like.

Although not illustrated in the drawing, once the input part 14 inputs user operation information of selecting the icon 56a representing the operation command and further selecting (a detailed menu bar of) the command setting window 54 in the program editing window 52, the program editing unit 11 generates a parameter setting view for linking the teaching point P5 constituting the operation trajectory M and the icon 56a representing the operation command, and the display part 12 displays the generated parameter setting view in the command setting window 54.

Next, once the input part 14 inputs user operation information for linking the teaching point P5 and the icon 56a representing the operation command in the command setting window 54, the program editing unit 11 generates a program view in which a mark for identifying the teaching point P5 is linked with the icon 56a representing the operation command, and the display part 12 displays the generated program view in the program editing window 52. Further, the program generating unit 13 creates the operation program in which the teaching point P5 is set as a parameter of the icon 56a representing the operation command.

Since the marks for identifying the teaching points P1 to P7 are the same between the operation trajectory window 51 and the program editing window 52, the user can link the teaching points P1 to P7 and the icon 56a representing the operation command in the program editing window 52 while referring to the teaching points P1 to P7 constituting the operation trajectory M in the operation trajectory window 51, thereby enabling intuitive program editing.

Once the input part 14 inputs user operation information of selecting the icon 55 representing the correction operation command based on the sensor information and moving it from the command selection window 53 to the program editing window 52, the program editing unit 11 copies the icon 55 representing the correction operation command and generates a program view in which a copied icon 55a representing the correction operation command is arranged, and the display part 12 displays the generated program view in the program editing window 52. In addition, the program generating unit 13 creates the operation program based on the arrangement of the icon 55a representing the correction operation command, the parameter setting of the correction operation command, and the like.

Once the input part 14 inputs user operation information of expanding or contracting the icon 55a representing the correction operation command based on the sensor information and linking the icon 55a and the icon 56a representing the control command in the program editing window 52, the program editing unit 11 generates a program view in which an icon group (the icon 56a representing the operation command in this example) representing the control command to which the correction operation command based on the sensor information is applied is sandwiched by the icon 55a representing the correction operation command, and the display part 12 displays the generated program view in the program editing window 52. Further, the program generating unit 13 creates an operation program reflecting the start position and the end position of the icon 55a representing the correction operation command.

The user operation of expanding or contracting the icon 55a representing the correction operation command and linking the icon 55a and the icon 56a representing the control command may be an operation of touching the icon 55a representing the correction operation command with two fingers and widening the distance of the fingers (so-called pinch-out), an operation of narrowing the distance of the fingers (so-called pinch-in), or the like.

Also, once the input part 14 inputs user operation information of expanding or contracting the icon 55a representing the correction operation command based on the sensor information and linking the icon 55a and the icon 56a representing the control command in the program editing window 52, the program editing unit 11 generates an operation trajectory view in which a correction section to which the correction operation is applied in the operation trajectory M is identified and depicted, and the display part 12 displays the generated operation trajectory view in the operation trajectory window 51. In this manner, the user can specify the start position and the end position of the correction operation command in the program editing window 52 while referring to the teaching points P1 to P7 constituting the operation trajectory M in the operation trajectory window 51, thereby enabling intuitive programming editing.

The identification of the correction section is performed by changing colors of the operation trajectory between the correction section and the other section, but in other embodiments, the identification may be performed by displaying only the operation trajectory in the correction section, or changing the color of the marks representing the teaching points P4 to P7, or changing the colors of the identification symbols in the marks representing the teaching points P4 to P7, or changing the shapes of the marks, or the like. In this manner, the user can teach the correction operation command in the program editing window 52 while referring to the correction section to which the correction operation is applied in the operation trajectory M in the operation trajectory window 51, thereby enabling intuitive programming editing.

Once the input part 14 inputs user operation information of selecting (a programming menu bar of) the command selection window 53 in the command selection window 53, the program editing unit 11 generates a command list view in which a list of the icons 55 to 56 representing the control command of the machine 30 is depicted, and the display part 12 displays the generated command list view in the command selection window 53.

Further, once the input part 14 inputs user operation information of selecting any one of command type tabs 53a to 53d representing types of the control command in the command selection window 53, the program editing unit 11 generates a command list view in which a list of icons are depicted for each type of control command, such as an operation command (operation A, operation B), a condition branching command (condition F, condition F), and the like and the display part 12 displays the generated command list view in the command selection window 53.

Figure 5:
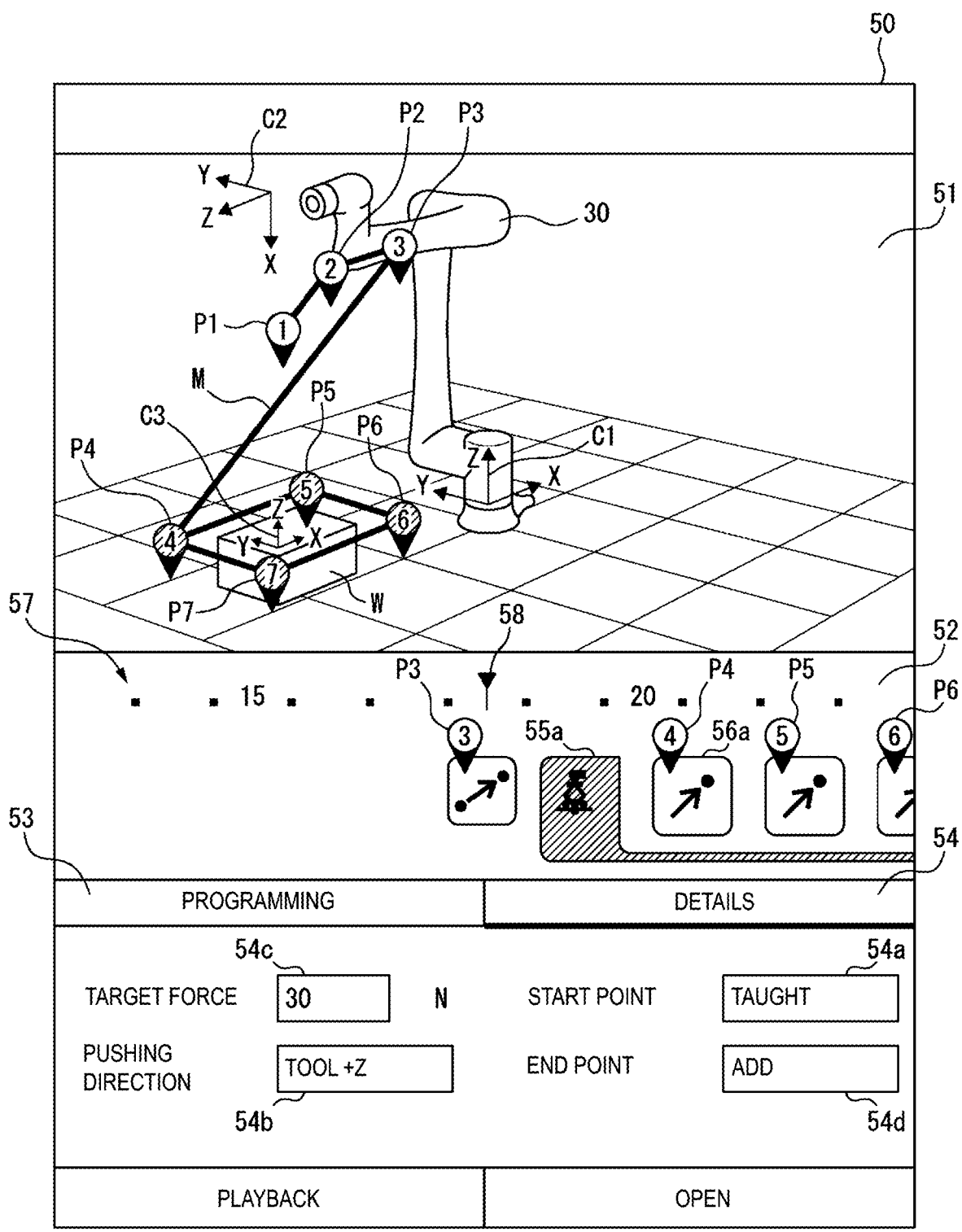
FIG. 5 is a diagram illustrating the programming screen according to the first embodiment.

FIG. 5 is a diagram illustrating the programming screen 50 according to the first embodiment. Once the input part 14 inputs user operation information of selecting any one of the icons 55a to 56a representing the control command and further selecting (the detailed menu bar of) the command setting window 54 in the program editing window 52, the program editing unit 11 generates a parameter setting view for setting parameters of the selected control command, and the display part 12 displays the generated parameter setting view in the command setting window 54.

Once the input part 14 inputs user operation information of selecting the icon 55a representing the correction operation command based on the sensor information and further selecting (the detailed menu bar of) the command setting window 54 in the program editing window 52, the program editing unit 11 generates a parameter setting view for setting parameters 54a to 54d of the correction operation command, and the display part 12 displays the generated parameter setting view in the command setting window 54.

As the parameters 54a to 54d of the correction operation command, the parameter setting view includes a target force, a pushing direction, a start point, an end point, and the like. The target force is a target pushing force of the machine 30 with respect to the workpiece W (or the tool 32), and the pushing direction is a pushing direction of the machine 30 with respect to the workpiece W (or the tool 32). The pushing direction is set in the Z direction of the tool coordinate system C2, but in other embodiments, the pushing direction may be set in any axial direction of the machine coordinate system C1, the workpiece coordinate system C3, the user coordinate system (not illustrated), or the like. Further the start point is a teaching point of the start position of the correction operation command, and the end point is a teaching point of the end position of the correction operation command. However, when the icon group (the icon 56a representing the operation command in this example) representing the control command is sandwiched by the icon 55a representing the correction operation command in the program editing window 52, it is not necessary to set the start point and the end point.

Although the icon 55a representing the correction operation command based on the sensor information sandwiches the icon group (the icon 56a representing the operation command in this example) representing the control command, it is possible to teach the operation trajectory M only with the positions of the teaching points P4 to P7 constituting the operation trajectory M in a case of a simple operation trajectory M constituted only by linear movement as in this example. In a case of such a simple operation trajectory M or when it is not necessary to program the operation command constituting the operation trajectory M, the teaching points P4 to P7 constituting the operation trajectory M may be set as parameters of the icon 55a representing the correction operation command.

Figure 6:
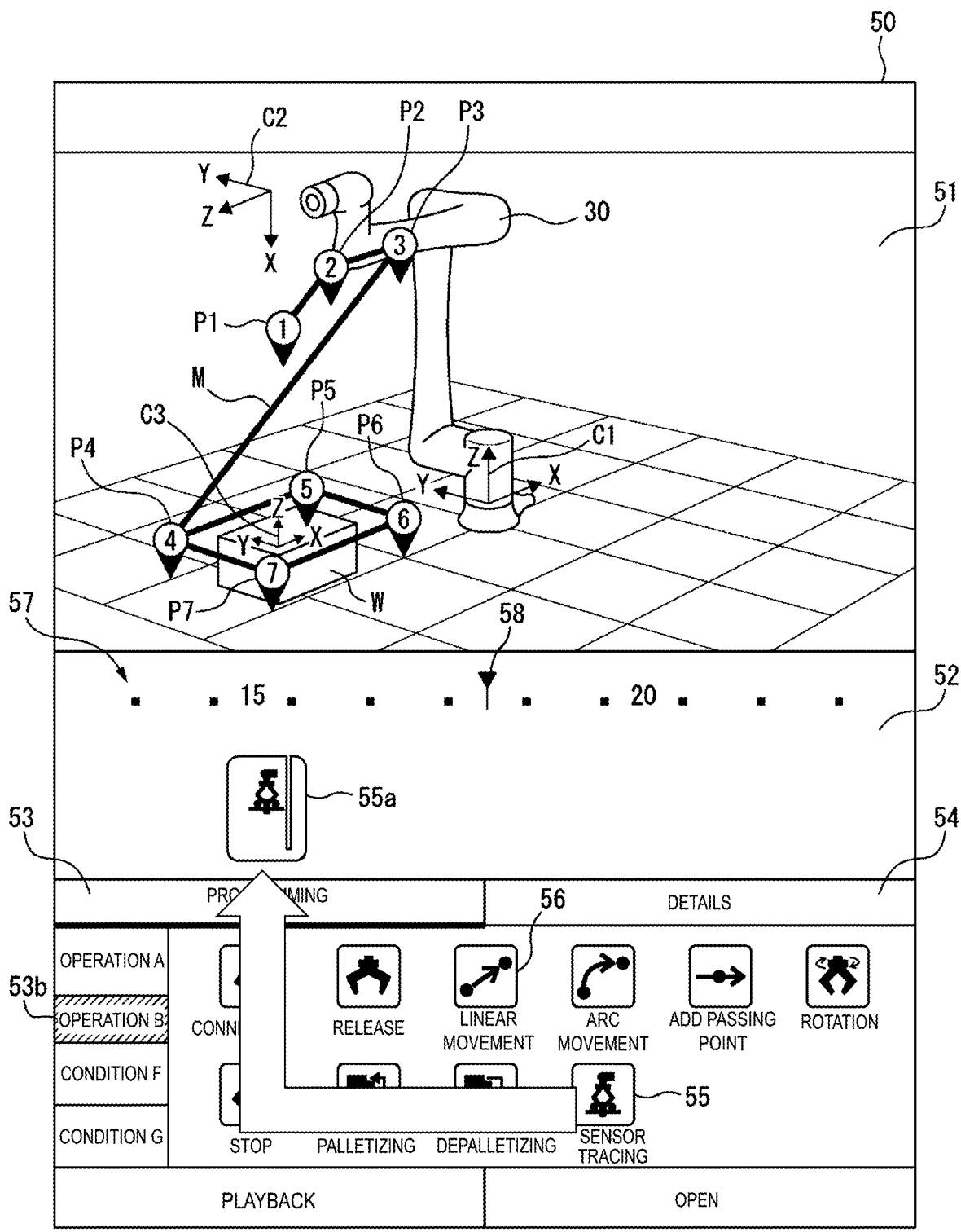
FIG. 6 is a diagram illustrating a modification example of the programming screen according to the first embodiment.

FIG. 6 is a diagram illustrating a modification example of the programming screen 50 according to the first embodiment. In a case of a simple operation trajectory M or when it is not necessary to program the operation command constituting the operation trajectory M, the icon 55a representing the correction operation command based on the sensor information is a single icon in the program editing window 52. The program editing unit 11 generates a program view in which the icon 55a representing the correction operation command is depicted, and the display part 12 displays the generated program view in the program editing window 52.

Figure 7:
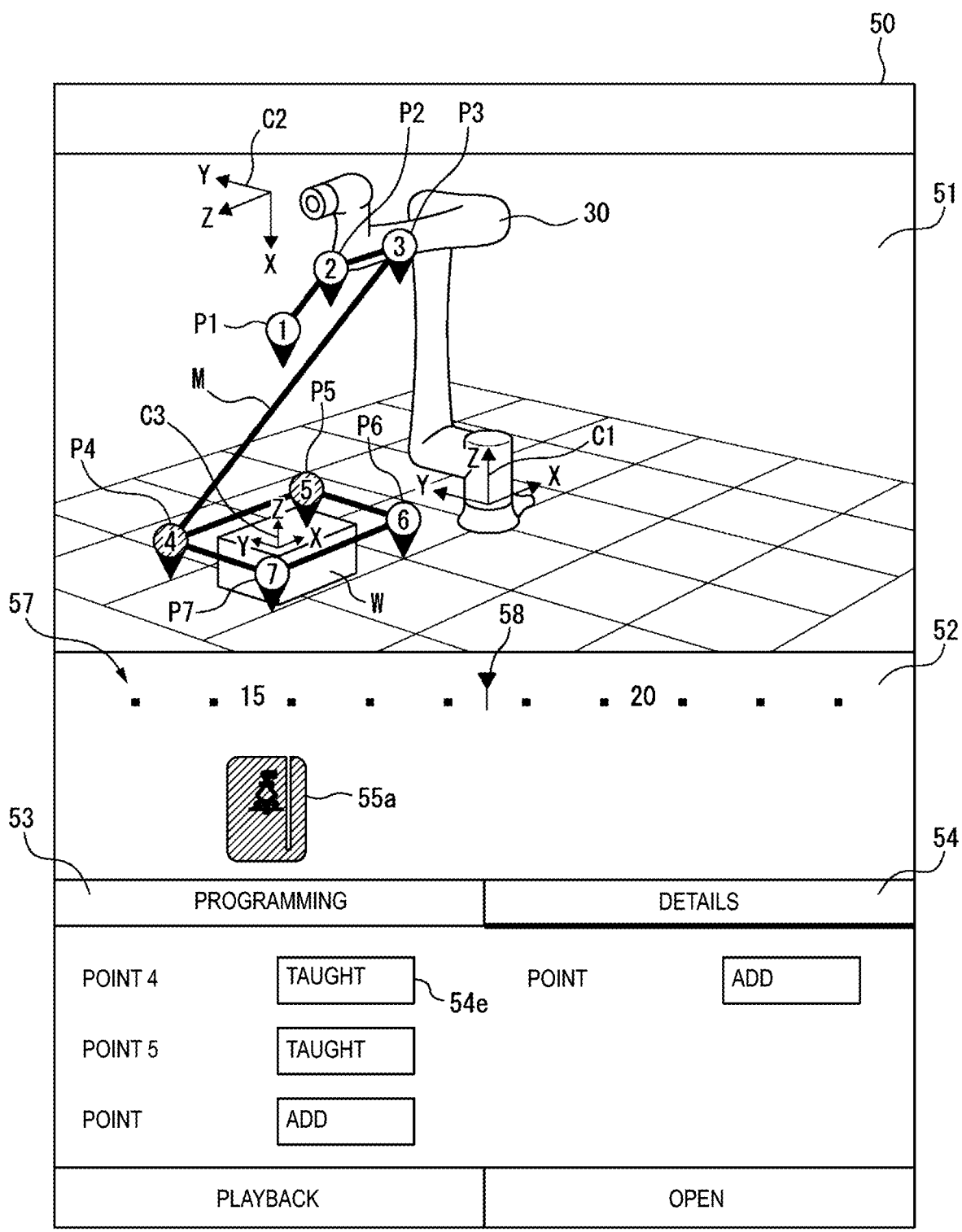
FIG. 7 is a diagram illustrating a modification example of the programming screen according to the first embodiment.

FIG. 7 is a diagram illustrating a modification example of the programming screen 50 according to the first embodiment. Once the input part 14 inputs user operation information of selecting the icon 55a representing the correction operation command based on the sensor information and further selecting (the detailed menu bar of) the command setting window 54 in the program editing window 52, the program editing unit 11 generates a parameter setting view for linking the teaching points P4 to P7 constituting the operation trajectory M and the icon 55a representing the correction operation command, and the display part 12 displays the generated parameter setting view in the command setting window 54. As the parameter 54e of the correction operation command, the parameter setting view includes an addition button for adding the teaching points constituting the operation trajectory M.

Once the input part 14 inputs user operation information of adding the teaching point P5 constituting the operation trajectory M in the command setting window 54, the program editing unit 11 generates a parameter setting view in which the addition button has been changed into "TAUGHT", and the display part 12 displays the generated parameter setting view in the command setting window 54. Further, the program editing unit 11 generates an operation trajectory view in which the added teaching point P5 is identified and depicted in the operation trajectory window 51, and the display part 12 displays the generated operation trajectory view in the operation trajectory window 51. In this manner, the user can associate the teaching point P5 with the icon 55a representing the correction operation command in the command setting window 54 while referring to the teaching points P1 to P7 constituting the operation trajectory M in the operation trajectory window 51, thereby enabling intuitive programming editing.

As described above, according to the machine system 1 of the first embodiment, it is possible to edit the teaching of the operation trajectory M before correction and the setting of the correction operation based on the sensor information on the same programming screen 50. Further, it is possible to check the positions of the teaching points P4 to P7 inside the correction section to which the correction operation is applied in the operation trajectory M on the same programming screen 50. Therefore, intuitive program editing becomes possible.

However, when the accuracy of the operation trajectory M before correction is low, a phenomenon may occur in which the machine 30 moves away from the workpiece W or conversely pushes the workpiece W more than necessary. In a second embodiment, a machine system 1 capable of automatically teaching an operation trajectory M before correction by a simple operation will be described.

Referring back to FIG. 3, in the machine system 1 according to the second embodiment, a program editing unit 11 sends a tracing operation command based on sensor information to an operation control unit 22, and the operation control unit 22 causes a machine 30 to execute a tracing operation. A sensor information acquiring unit 21 acquires the sensor information from a sensor 40 and sends the acquired sensor information to the operation control unit 22, and the operation control unit 22 repeats tracing control of generating an operation correction amount based on the received sensor information, generating a tracing operation command based on the generated operation correction amount, and sending the generated tracing operation command to the machine 30.

The program editing unit 11 receives the sensor information from the sensor information acquiring unit 21, generates the operation correction amount based on the received sensor information, and records a tracing trajectory based on the generated operation correction amount, but in other embodiments, the program editing unit 11 may receive the operation correction amount from the operation control unit 22 and record the tracing trajectory based on the received operation correction amount, or may receive a corrected tracing operation command from the operation control unit 22 and record the tracing trajectory based on the received tracing operation command. The program editing unit 11 automatically teaches the operation trajectory M before correction based on the recorded trajectory. Since the other configurations of the machine system 1 in the second embodiment are the same as the configurations of the machine system 1 according to the first embodiment, description thereof will be omitted.

Figure 8:
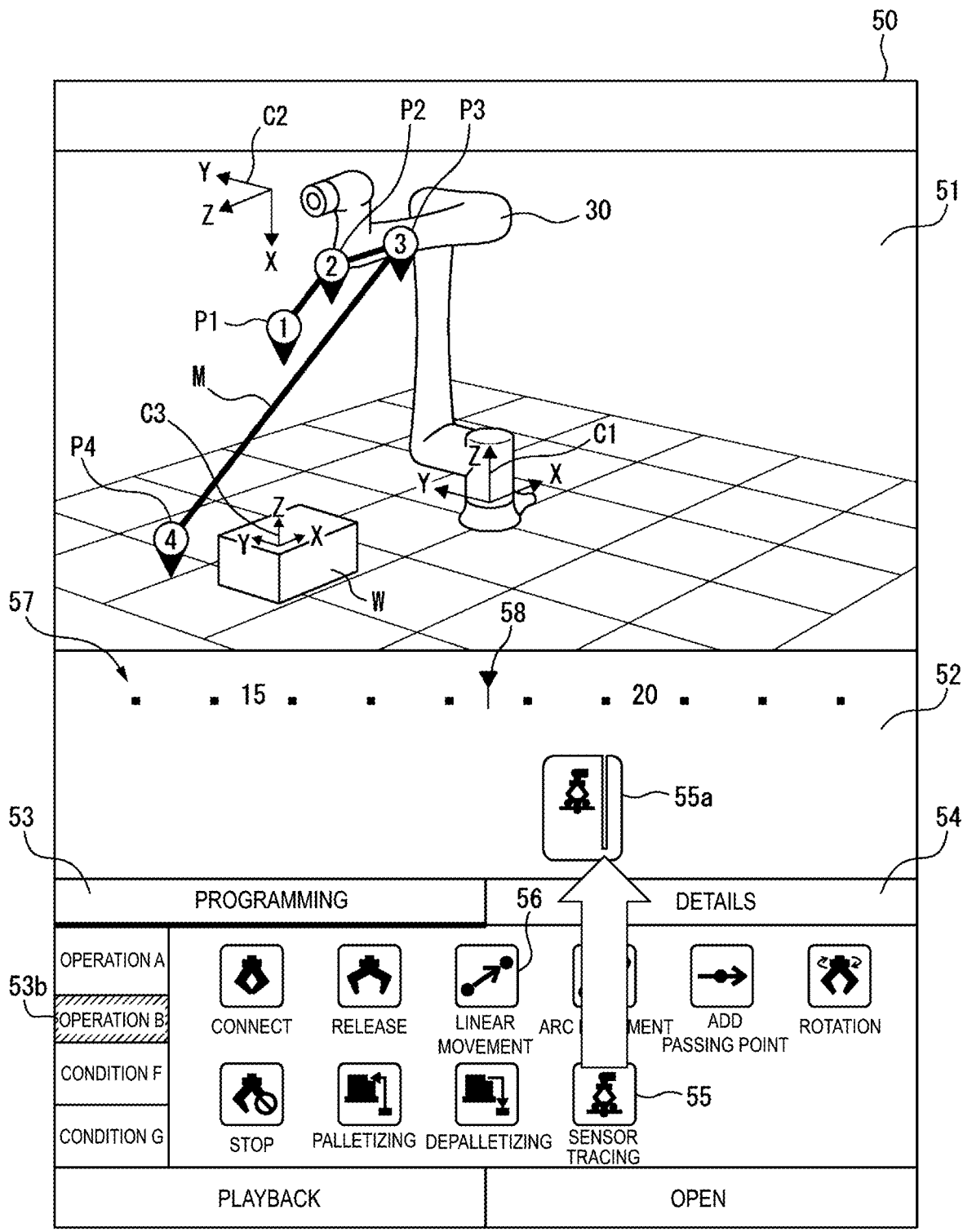
FIG. 8 is a diagram illustrating a programming screen according to a second embodiment.

FIG. 8 is a diagram illustrating a programming screen 50 according to the second embodiment. Once the input part 14 inputs user operation information of selecting the icon 55 representing the correction operation command based on the sensor information and moving it from the command selection window 53 to the program editing window 52, the program editing unit 11 copies the icon 55 representing the correction operation command and generates a program view in which a copied icon 55a representing the correction operation command is arranged, and the display part 12 displays the generated program view in the program editing window 52. In addition, the program generating unit 13 creates an operation program based on a parameter setting and the like of the correction operation command.

Figure 9:
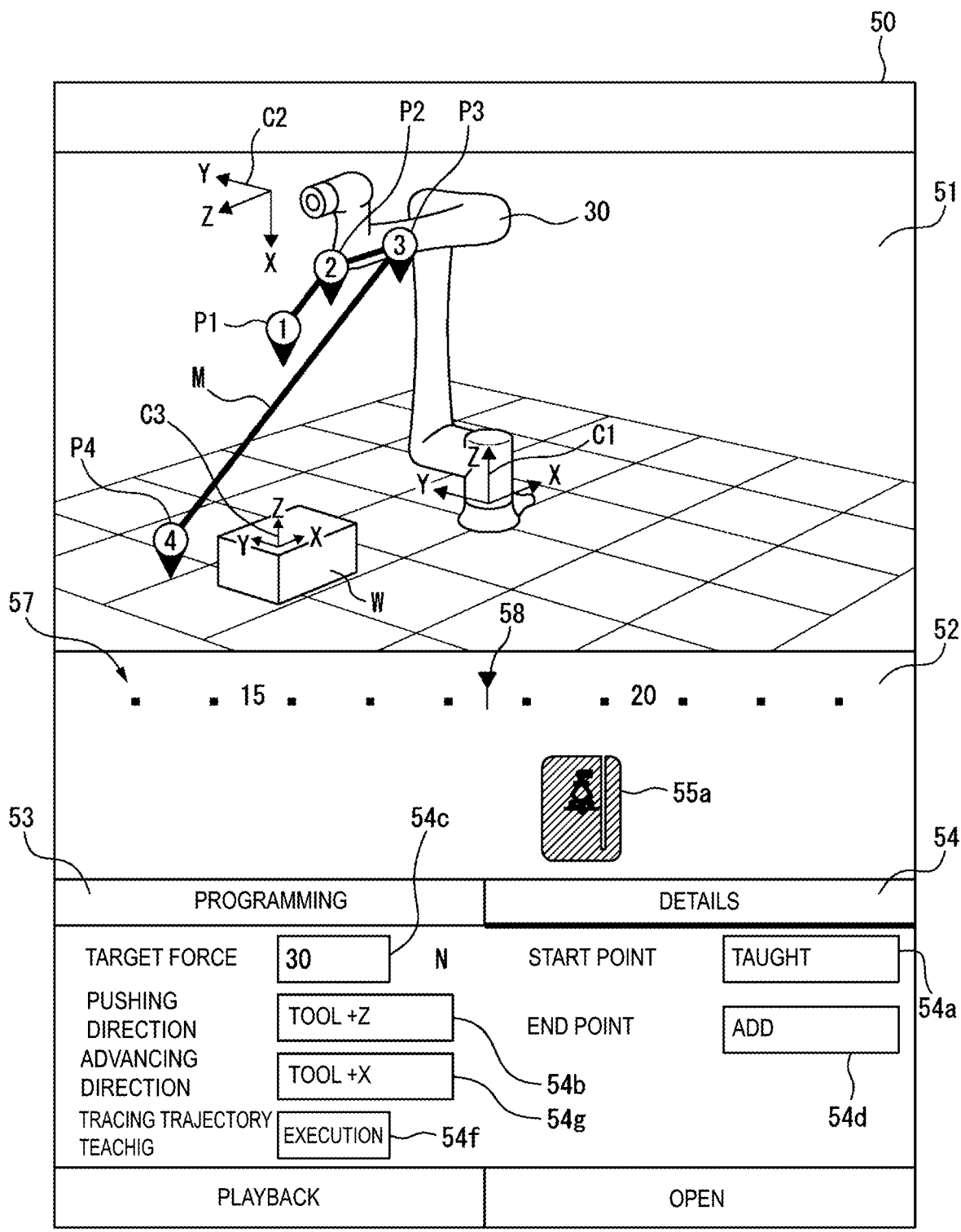
FIG. 9 is a diagram illustrating the programming screen according to the second embodiment.

FIG. 9 is a diagram illustrating the programming screen 50 according to the second embodiment. Once the input part 14 inputs user operation information of selecting an icon 55a representing a correction operation command based on sensor information and further selecting (a detailed menu bar of) a command setting window 54 in a program editing window 52, the program editing unit 11 generates a parameter setting view for setting parameters 54a to 54d, 54g, and 54f for the correction operation command, and the display part 12 displays the generated parameter setting view in the command setting window 54.

In addition to the aforementioned parameters 54a to 54d of the correction operation command, the parameter setting view includes, as a parameter 54f for the correction operation command, an execution button for the tracing trajectory teaching, which causes the machine 30 to execute a tracing operation based on sensor information, records the trajectory during the tracing operation, and automatically teaches the operation trajectory M before correction based on the recorded trajectory. Further, the parameter setting view further includes an advancing direction of the tracing operation as a parameter 54g for the correction operation command. The advancing direction is an advancing direction of the machine 30 relative to the workpiece W (or the tool 32). The advancing direction is set in an X direction of the tool coordinate system C2, in other embodiments, the traveling direction may be set in any axial direction of a machine coordinate system C1, a workpiece coordinate system C3, a user coordinate system (not illustrated), or the like.

Figure 10:
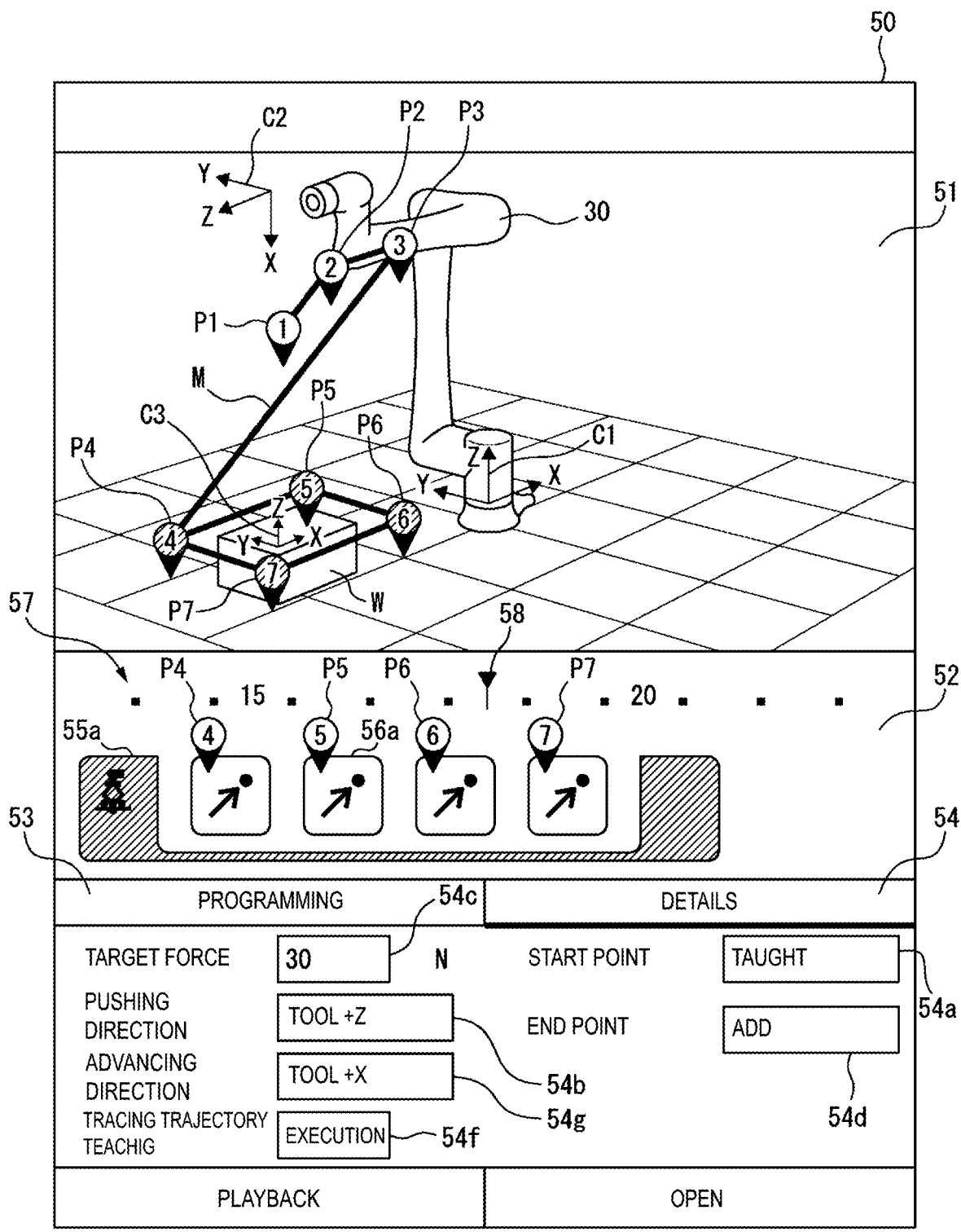
FIG. 10 is a diagram illustrating the programming screen according to the second embodiment.

FIG. 10 is a diagram illustrating the programming screen 50 according to the second embodiment. Once the input part 14 inputs user operation information of executing the tracing trajectory teaching in the command setting window 54, the program editing unit 11 causes the machine 30 to execute the tracing operation based on the sensor information, records the trajectory during the tracing operation, performs conversion into an icon group representing a control command (56a representing an operation command in this example) constituting the recorded trajectory, and generates a program view in which the converted icon group representing the control command is sandwiched by the icon 55a representing the correction operation command based on the sensor information, and the display part 12 displays the generated program view in the program editing window 52. In this manner, it is possible to automatically teach the operation trajectory M before correction with a simple operation. Also, the program generating unit 13 creates an operation program based on the icon 55a representing the correction operation command, the converted icon group representing the control command, the parameter setting, and the like.

Moreover, the program editing unit 11 depicts the automatically taught operation trajectory M and further generates an operation trajectory view in which a correction section to which the correction operation is applied in the operation trajectory M is identified and depicted in the operation trajectory window 51, and the display part 12 displays the generated operation trajectory view in the operation trajectory window 51.

The identification of the correction section is performed by changing colors of the operation trajectory between the correction section and the other section, but in other embodiments, the identification may be performed by displaying only the operation trajectory in the correction section, or changing the color of the marks representing the teaching points P4 to P7, or changing the colors of the identification symbols in the marks representing the teaching points P4 to P7, or changing the shapes of the marks, or the like. In this manner, the user can check the operation trajectory M after the tracing trajectory teaching, in the operation trajectory window 51, thereby enabling intuitive programming editing.

It should be noted that instead of sandwiching the icon group representing the control command (the icon 56a representing the operation command in this example) after the tracing trajectory teaching with the icon 55a representing the correction operation command, the teaching points P4 to P7 after tracing trajectory teaching may be set as parameters for the icon 55a representing the correction operation command. In this case, the icon 55a representing the correction operation command is a single icon.

As described above, the machine system 1 of the second embodiment causes the machine 30 to execute the tracing operation based on the sensor information, records the trajectory during the tracing operation, and automatically teaches the operation trajectory M before correction based on the recorded trajectory, and thus the accuracy of the operation trajectory M before correction can be expected to improve. In other words, it is possible to suppress a phenomenon of the machine 30 moving away from the workpiece W, or conversely pushing the workpiece W to an unnecessarily high extent on the contrary. Further, the user can check the operation trajectory M before correction after the tracing trajectory teaching in the operation trajectory window 51, thereby enabling intuitive programming editing.

However, it may be desired to manually teach a rough operation trajectory M, cause the machine 30 to execute a tracing operation based on sensor information, record the trajectory during the tracing operation, and modify the rough operation trajectory M based on the recorded trajectory, instead of executing the tracing trajectory teaching with no original operation trajectory M. Further, it is possible to expect an improvement in accuracy of the operation trajectory M by further modifying the modified operation trajectory M. In a third embodiment, a machine system 1 that modifies an original operation trajectory M will be described.

Referring back to FIG. 3, in the machine system 1 according to the third embodiment, a program editing unit 11 sends a tracing operation command including an original operation trajectory M to an operation control unit 22, and the operation control unit 22 causes a machine 30 to execute a tracing operation. A sensor information acquiring unit 21 acquires the sensor information from a sensor 40 and sends the acquired sensor information to the operation control unit 22, and the operation control unit 22 repeats tracing control of generating an operation correction amount based on the received sensor information, generating a tracing operation command based on the generated operation correction amount, and sending the generated tracing operation command to the machine 30.

The program editing unit 11 receives the sensor information from the sensor information acquiring unit 21, generates the operation correction amount based on the received sensor information, and records a tracing trajectory based on the generated operation correction amount, but in other embodiments, the program editing unit 11 may receive the operation correction amount from the operation control unit 22 and record the tracing trajectory based on the received operation correction amount, or may receive a corrected tracing operation command from the operation control unit 22 and record the tracing trajectory based on the received tracing operation command. The program editing unit 11 modifies the original operation trajectory M based on the recorded trajectory. Since the other configurations of the machine system 1 according to the third embodiment are the same as the configurations of the machine system 1 according to the first embodiment, description thereof will be omitted.

Figure 11:
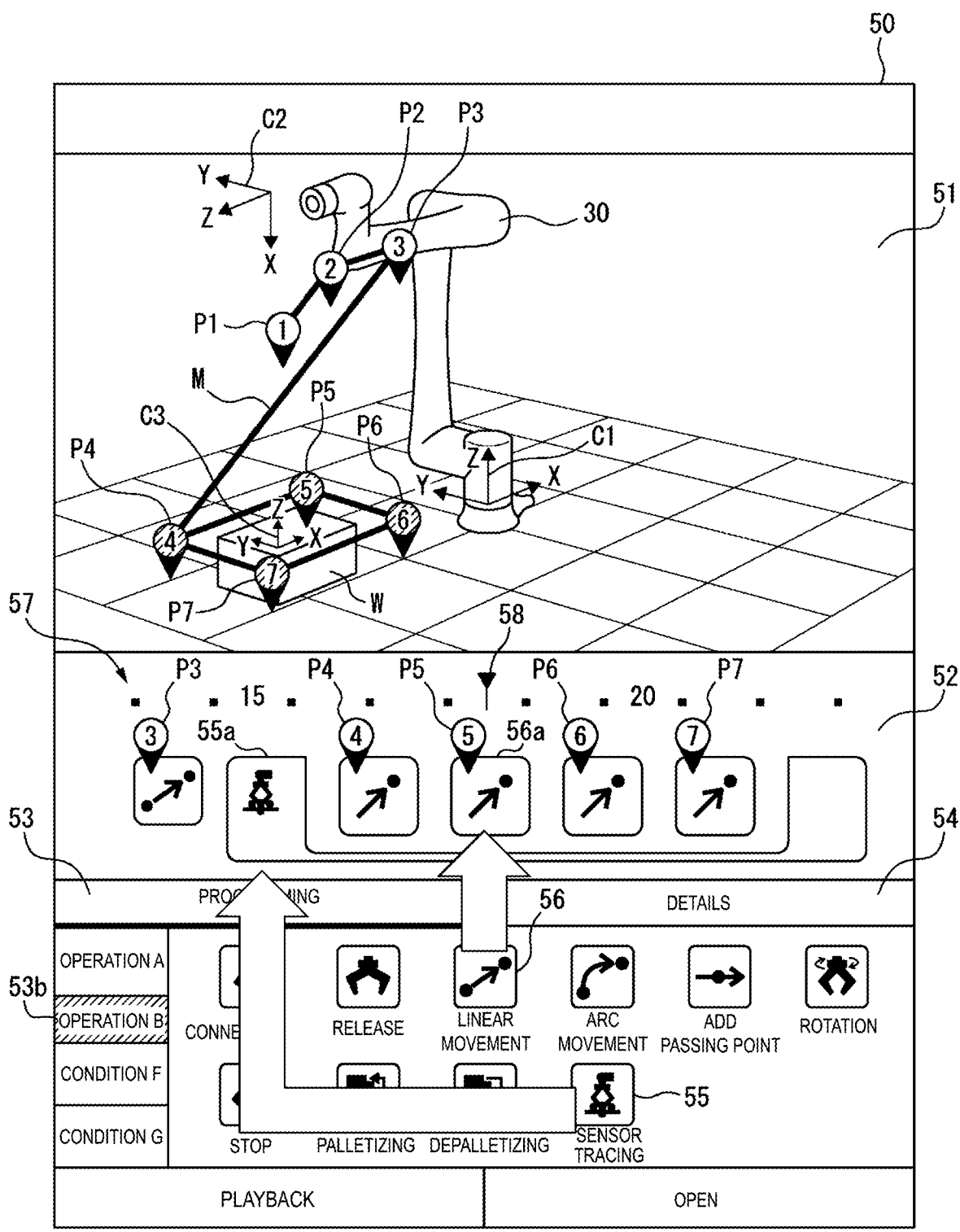
FIG. 11 is a diagram illustrating a programming screen according to a third embodiment.

FIG. 11 is a diagram illustrating a programming screen 50 according to the third embodiment. A rough operation trajectory M including teaching points P4 to P7 is manually taught in an operation trajectory window 51, but in other embodiments, the operation trajectory M before correction may be automatically taught by a tracing trajectory teaching function. An icon group representing a control command (an icon 56a representing an operation command in this example) is sandwiched by an icon 55a representing a correction operation command, and a start position and an end position of the correction operation command are specified, in a program editing window 52.

Figure 12:
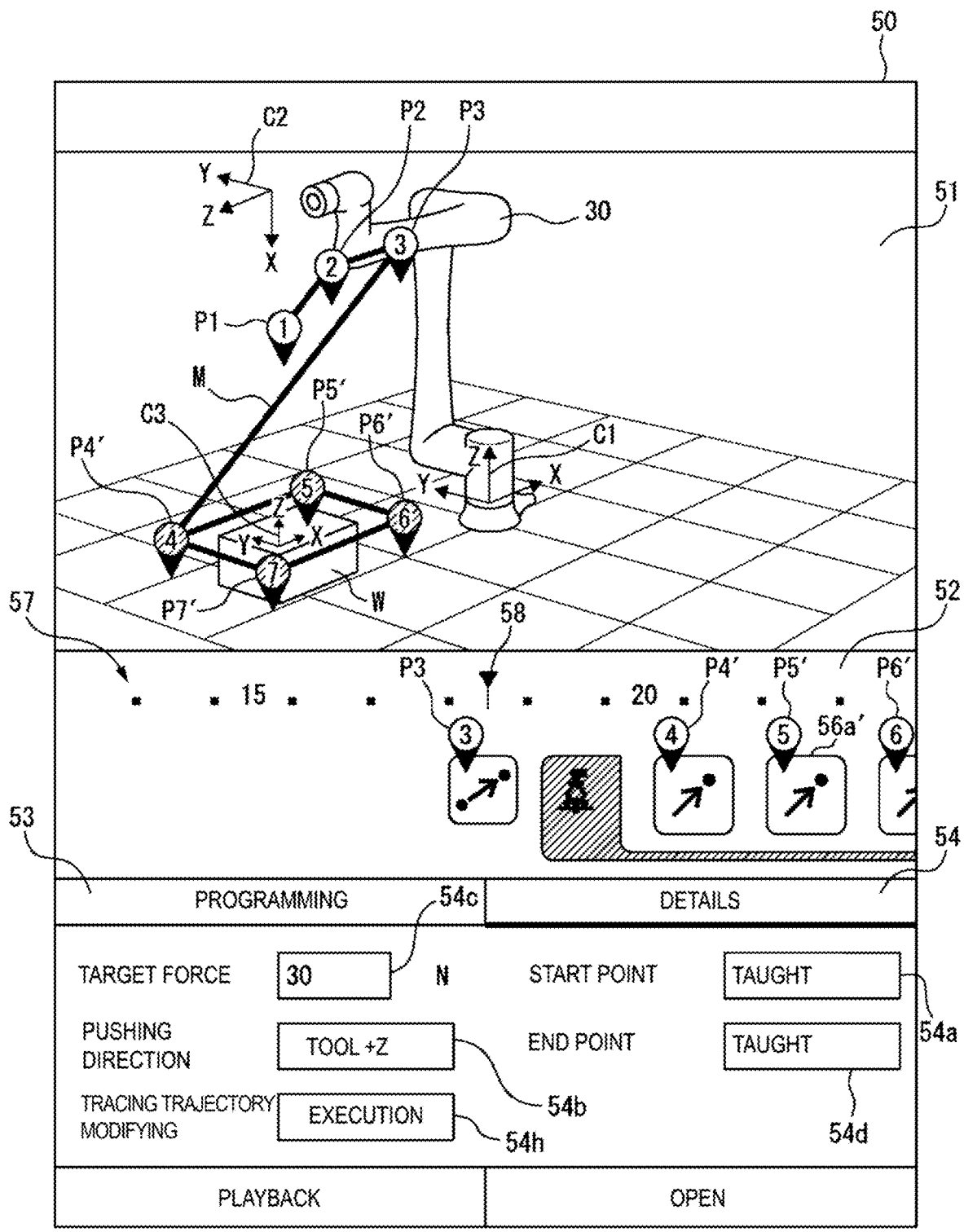
FIG. 12 is a diagram illustrating the programming screen according to the third embodiment.

FIG. 12 is a diagram illustrating the programming screen 50 according to the third embodiment. Once the input part 14 inputs user operation information of selecting the icon 55a representing a correction operation command based on sensor information and further selecting (a detailed menu bar of) the command setting window 54 in the program editing window 52, the program editing unit 11 generates a parameter setting view for setting parameters 54a to 54d and 54h for the correction operation command, and the display part 12 displays the generated parameter setting view in the command setting window 54.

In addition to the aforementioned parameters 54a to 54d for the correction operation command, the parameter setting view includes, as the parameter 54h for the correction operation command, an execution button for tracing trajectory modification, which causes the machine 30 to execute the tracing operation based on the sensor information, records the trajectory during the tracing operation, and automatically modifies the original operation trajectory M based on the recorded trajectory.

Once the input part 14 inputs user operation information of executing the tracing trajectory modification in the command setting window 54, the program editing unit 11 causes the machine 30 to execute the tracing operation based on the sensor information, records the trajectory during the tracing operation, performs conversion into an icon group representing a control command (an icon 56a' representing an operation command in this example) constituting the recorded trajectory, and generates a program view in which the icon group representing the control command (the icon 56a representing the operation command in this example) constituting the original operation trajectory M is replaced with the converted icon group representing the control command (the icon 56a' representing the operation command in this example), and the display part 12 displays the generated program view in the program editing window 52. In this manner, it is possible to generate an accurate operation trajectory even if a rough operation trajectory M is taught. Also, it is possible to expect an improvement in accuracy of the operation trajectory M by further performing the tracing trajectory modification based on the modified operation trajectory M. In addition, the operation program is created based on the icon 55a representing the correction operation command, the converted icon group representing the control command, the parameter setting, and the like.

As described above, the machine system 1 of the third embodiment causes the machine 30 to execute the tracing operation based on the sensor information, records the trajectory during the tracing operation, and automatically modifies the original operation trajectory M based on the recorded trajectory, and thus the accuracy of the operation trajectory M before correction can be expected to improve. In addition, the user can check the operation trajectory M after the tracing trajectory modification in the operation trajectory window 51, thereby enabling intuitive programming editing.

Although the first embodiment to the third embodiment have been described assuming the machine systems 1 that perform deburring on the workpiece W, the machine systems 1 according to these embodiments can also be applied to machine systems that perform other kinds of working, such as cutting, welding, fitting, fastening, hemming, sealing, and the like. A fourth embodiment will be briefly described assuming a machine system 1 that performs fitting of a workpiece W1 and a workpiece W2.

Figure 13:
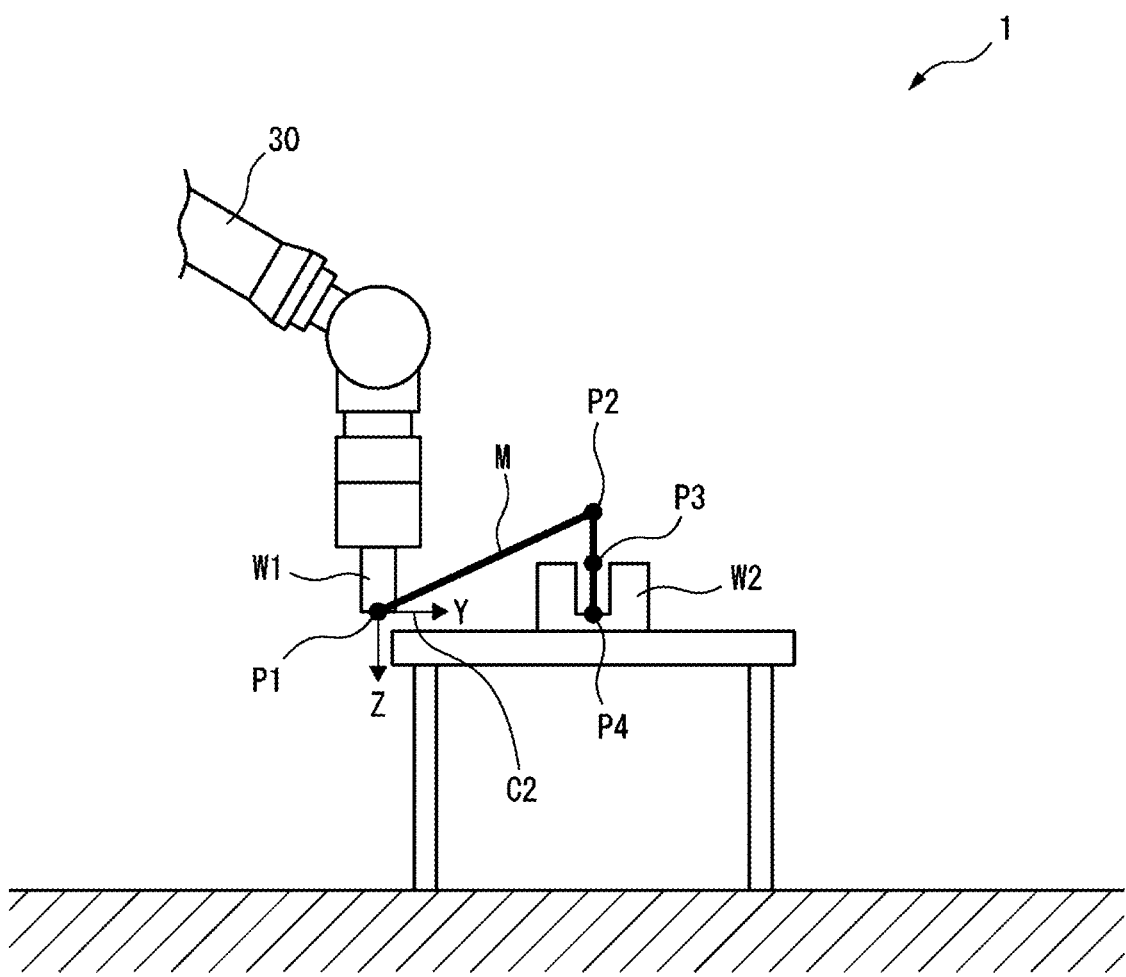
FIG. 13 is a side view of a machine system according to a fourth embodiment.

FIG. 13 is a side view of the machine system 1 according to the fourth embodiment. The machine 30 transports a rod-shaped workpiece W1 and fits the workpiece W1 into a fitting hole of the workpiece W2. When an operation program for such the machine 30 is created, it is possible to create an operation program for performing fitting by teaching teaching points P1 to P4 constituting an operation trajectory M of the machine 30 through which a distal end point of the workpiece W1 passes in an operation trajectory window 51 (see FIG. 4), sandwiching an icon group representing a control command (an icon 56a representing an operation command in this example) inside a correction section to which the correction operation is applied in the operation trajectory M with an icon 55a representing a correction operation command based on sensor information in a program editing window 52, and setting parameters for the icon 55a representing the correction operation command in a command setting window 54.

In other words, it is possible to edit the teaching of the operation trajectory M before correction and the setting of the correction operation based on the sensor information on the same programming screen 50 even when the operation program for the machine 30 that performs fitting is created, thereby enabling intuitive program editing. Further, even when the machine system is adapted to perform not only fitting but also other kinds of machining such as cutting, welding, fastening, hemming, sealing and the like, it is possible to intuitively create the operation program of the machine 30 in a similar manner.

Figure 14:
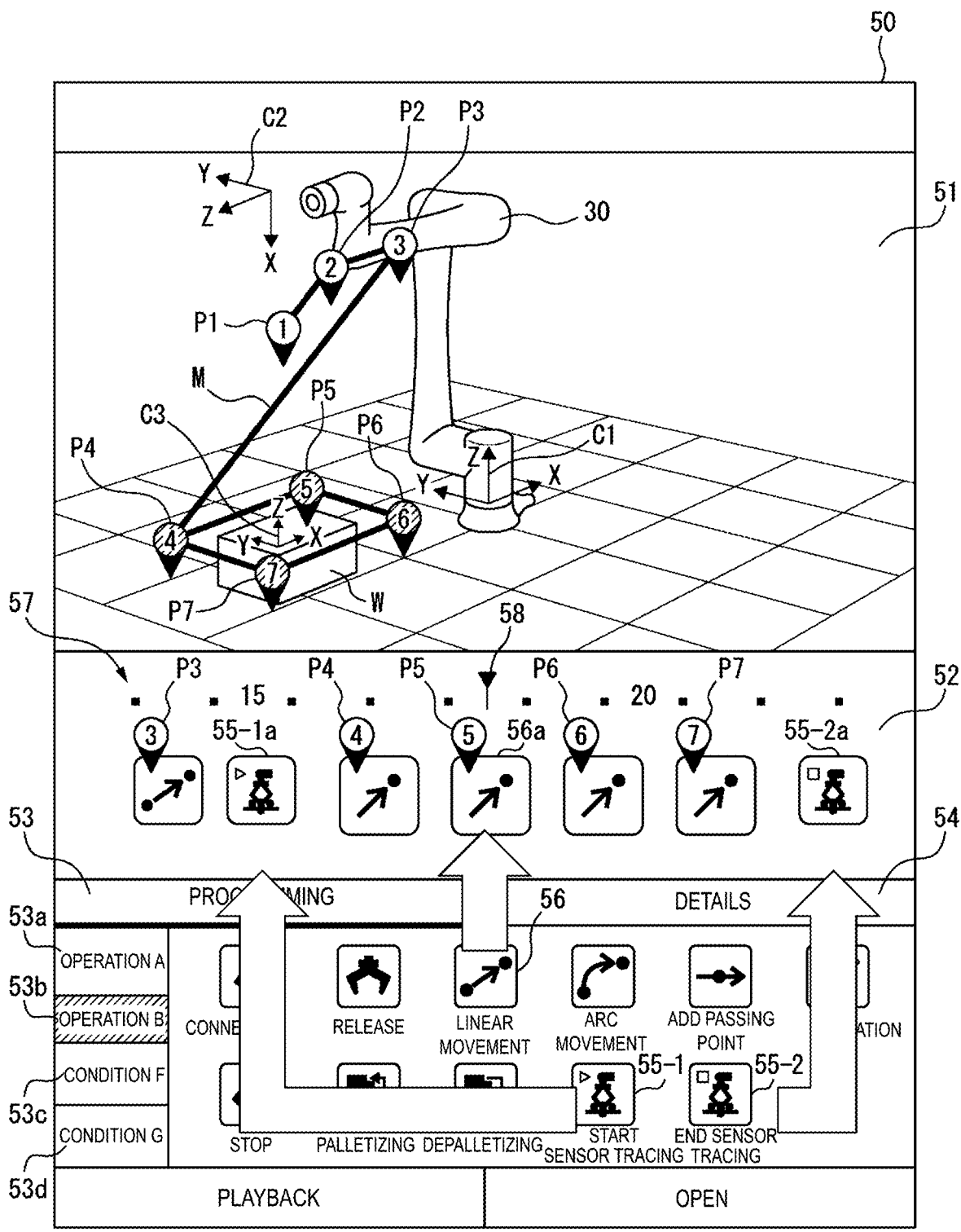
FIG. 14 is a diagram illustrating a programming screen according to a fifth embodiment.

FIG. 14 is a diagram illustrating a programming screen according to a fifth embodiment. An icon 55 representing a correction operation command may be composed of two icons. In other words, the icon 55 representing a correction operation command includes an icon 55-1 representing a start of a correction operation command and an icon 55-2 representing an end of the correction operation command.

Once an input part 14 inputs user operation information of selecting the icon 55-1 representing a start of a correction operation command or an icon 55-2 representing an end of the correction operation command and moving it from a command selection window 53 to a program editing window 52, a program editing unit 11 copies an icon 55-1 representing the start of the correction operation command or the icon 55-2 representing the end of the correction operation command, and generates a program view in which the copied icon 55-1a representing the start of the correction operation command and the copied icon 55-1b representing the end of the correction operation command are disposed, the display part 12 displays the generated program view in a program editing window 52. In addition, the program generating unit 13 creates the operation program based on arrangement of the icon 55a representing the start of the correction operation command and the icon 55b representing the end of the correction operation command, and the parameter setting of the correction operation command.

Once the input part 14 inputs user operation information of moving the icon 55-1a representing the start of the correction operation command or the icon 55-2a representing the end of the correction operation command in the program editing window 52, the program editing unit 11 generates a program view in which an icon group (the icon 56a representing an operation command in the present example) representing a control command to which the correction operation command based on the sensor information is applied is sandwiched between the icon 55-1a representing the start of the correction operation command and the icon 55-2a representing the end of the correction operation command, and the display part 12 displays the generated program view in the program editing window 52. Also, the program generating unit 13 creates an operation program reflecting the position of the icon 55-1a representing the start of the correction operation command and the position of the icon 55-2a representing the end of the correction operation command.

The user operation of moving the icon 55-1a representing the start of the correction operation command or the icon 55-2a representing the end of the correction operation command for linking it to the icon 56a representing the control command may be an operation of touching the icon 55-1a representing the start of the correction operation command or the icon 55-2a representing the end of the correction operation command with one finger and moving it (so-called drag and drop) or the like.

Further, once the input part 14 inputs user operation information of moving the icon 55-1a representing the start of the correction operation command or the icon 55-2a representing the end of the correction operation command and linking it to the icon 56a representing the control command in the program editing window 52, the program editing unit 11 generates an operation trajectory view in which a correction section to which the correction operation is applied in the operation trajectory M is identified and depicted, and the display part 12 displays the generated operation trajectory view in the operation trajectory window 51. In this manner, the user can specify the start position and the end position of the correction operation command in the program editing window 52 while referring to the teaching points P1 to P7 constituting the operation trajectory M in the operation trajectory window 51, thereby enabling intuitive programming editing.

The aforementioned computer program may be recorded and provided in a computer-readable non-transitory recording medium, for example, a CD-ROM or the like or may be distributed and provided from a server device on a wide area network (WAN) or a local area network (LAN) via wired or wireless connection.

Although various embodiments have been described in this specification, the present invention is not limited to the above-described embodiments, and it is to be understood that various changes can be made without departing from the scope of the appended claims.

The invention claimed is:
1. A program creation device, comprising:
 a display part configured to display a screen including an operation trajectory of a machine, a control command of the machine, and a parameter setting of the control command;

an input part configured to input user operation information on the screen; and a program editing unit configured to edit an operation program of the machine by linking teaching of the operation trajectory and parameter setting of a correction operation command based on sensor information on the same screen, based on the user operation information.

2. The program creation device of claim 1, wherein the program editing unit generates a view in which an icon representing a control command in a correction section to which a correction operation is applied in the operation trajectory is sandwiched by an icon representing a correction operation command based on the sensor information, and the display part displays the generated view on the screen.

3. The program creation device of claim 1, wherein the program editing unit generates a view that links a teaching point constituting the operation trajectory to an icon representing a correction operation command based on the sensor information, and a display part displays the generated view on the screen.

4. The program creation device of claim 1, wherein the program editing unit causes the machine to execute a tracing operation based on the sensor information, records a trajectory during the tracing operation, and generates a view including a tracing trajectory teaching function for automatically teaching the operation trajectory before correction based on the recorded trajectory, and the display part displays the generated view on the screen.

5. The program creation device of claim 4, wherein the program editing unit performs conversion into an icon representing the control command constituting the recorded trajectory and generates a view in which the converted icon representing the control command is sandwiched between icons representing a correction operation command based on the sensor information, and the display part displays the generated view on the screen.

6. The program creation device of claim 1, wherein the program editing unit causes the machine to execute a tracing operation based on the sensor information, records a trajectory during the tracing operation, and generates a view including a tracing trajectory modifying function for automatically modifying the original operation trajectory based on the recorded trajectory, and the display part displays the generated view on the screen.

7. The program creation device of claim 6, wherein the program editing unit performs conversion into an icon representing the control command constituting the recorded trajectory and generates a view in which an icon representing the control command constituting the original operation trajectory is replaced with the converted icon representing the control command, and the display part displays the generated view on the screen.

8. The program creation device of claim 1, wherein the program editing unit generates a view obtained by identifying a correction section to which a correction operation is applied in the operation trajectory and depicting the correction section in a virtual space where a shape model of the machine is arranged, and the display part displays the generated view.

9. The program creation device of claim 2, wherein the icon representing a correction operation command based on the sensor information includes an icon representing a start of the correction operation command and an icon representing an end of the correction operation command.

\* \* \* \* \*